J. J. KOGER.
AUTOMOBILE POWER TRANSMITTING APPARATUS.
APPLICATION FILED DEC. 20, 1918.
1,309,481. Patented July 8, 1919.
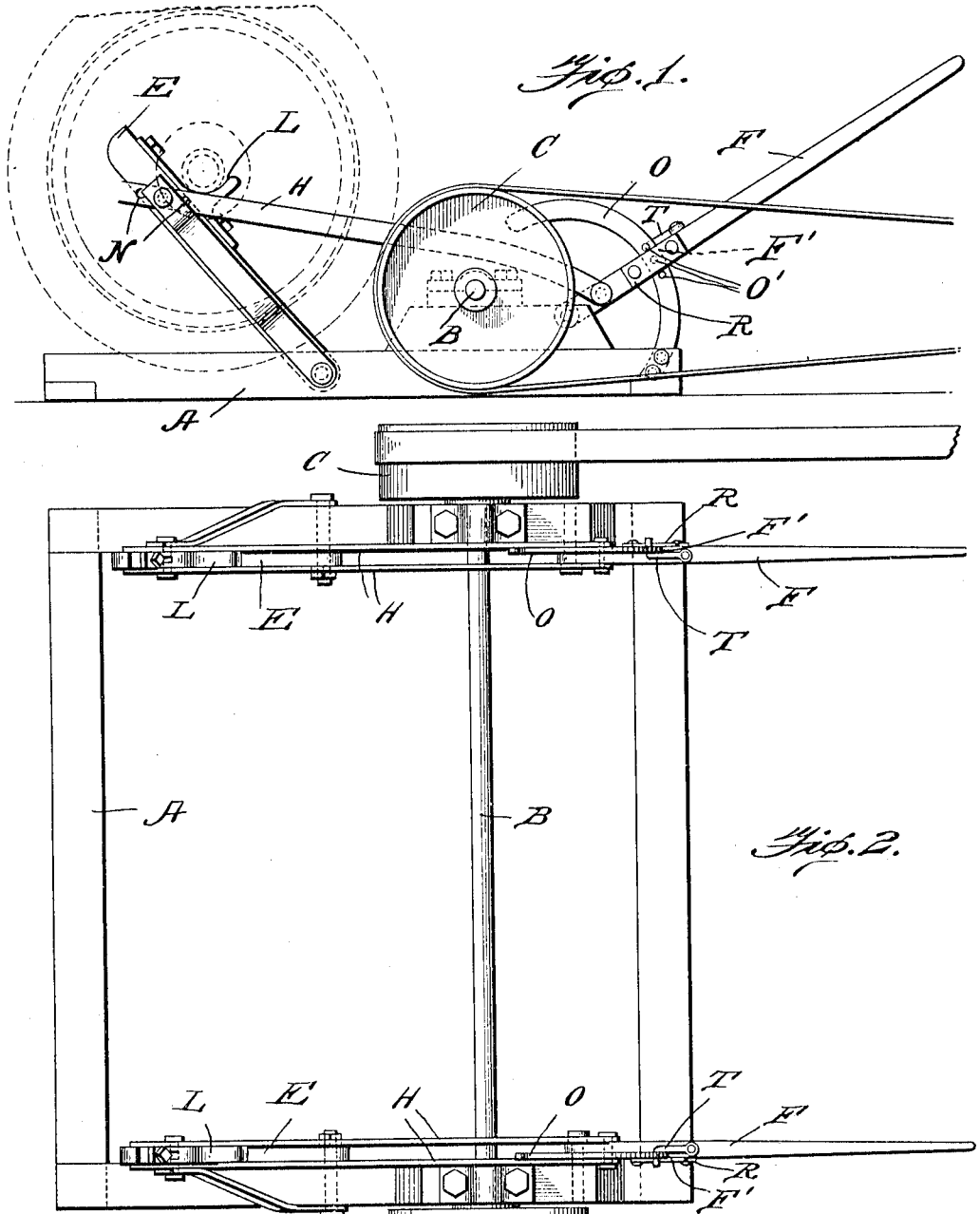

UNITED STATES PATENT OFFICE.

JOHN JAMES KOGER, OF MORRISTOWN, TENNESSEE.

AUTOMOBILE POWER-TRANSMITTING APPARATUS.

1,309,481. Specification of Letters Patent. Patented July 8, 1919.

Application filed December 20, 1918. Serial No. 267,672.

*To all whom it may concern:*

Be it known that I, JOHN J. KOGER, a citizen of the United States, residing at Morristown, in the county of Hamblen and State of Tennessee, have invented certain new and useful Improvements in Automobile Power-Transmitting Apparatus; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in automobile power transmitting apparatus, and consists of a simple means whereby power from the engine of an automobile may be utilized for various purposes.

The invention comprises a simple and efficient device of this nature, having various details of construction, combination and arrangement of parts which will be hereinafter fully described, shown in the accompanying drawings and then specifically defined in the appended claims.

My invention is illustrated in the accompanying drawings which, with the letters of reference marked thereon, form a part of this application and in which:

Figure 1 is a side elevation, showing the application of the invention, and

Fig. 2 is a top plan view.

Reference now being had to the details of the drawings by letter:—

A designates a frame having a shaft B journaled in suitable bearings therein, and to which frictional wheels C are fixed to the ends thereof outside the frame. Power may be transmitted through said shaft to any location where it is desired to operate the mechanism. Pivotally mounted upon the beams of the frame are the bars E, and F designate levers pivotally mounted upon either side of the frame, and H are links which pivotally connect the levers with said bars E. The bars E are provided with concaved shoes or bracket members L upon which an axle of an automobile is adapted to rest. The links are provided with perforations N, affording means whereby the latter may be adjusted to adapt the apparatus for automobiles of different sizes.

A curved segment member O is fastened to each side of the frame and has perforations O' therein. Each lever F, there being one upon each side, has a recess F', through which the curved segment member passes, and a plate R spans the recess in each lever and is adapted to hold the segment member within the recess as the lever is moved. A hook T is pivoted to each lever, and is adapted to engage one or the other of the perforations in the segment member, for the purpose of holding the shoes, which engage the axis of the automobile, at different elevations.

In operation, the automobile is moved so that the concaved shoes will be positioned underneath the driving axle, after which the operator by swinging the levers upon their pivots, may cause the axle to be raised so that the wheels will clear the ground and come in contact with said friction driving wheels. When the driving wheel of the axle of the automobile is driven power will be transmitted to the shaft and from which belted connections may be made to drive any apparatus.

What I claim to be new is:

1. An automobile power transmitting apparatus, comprising a frame, a shaft journaled therein, friction wheels fixed to the latter, levers pivotally mounted upon the frame, bars pivoted to the latter and having shoes for engagement with the axle of the automobile, pivotal connection between said bars and levers, segments fastened to the frame, and means upon the levers coöperating with the segments to support the shoes at different elevations.

2. An automobile power transmitting apparatus, comprising a frame, a shaft journaled therein, friction wheels fixed to the latter, levers pivotally mounted upon the frame, bars pivoted to the latter and having shoes for engagement with the axle of the automobile, pivotal connections between said bars and levers, curved segments fastened to the frame, and having apertures therein, hooks fastened to the levers and engaging the apertures in the segments to hold the shoes at different elevations.

3. An automobile power transmitting apparatus, comprising a frame, a shaft journaled therein, friction wheels fixed to the latter, levers pivotally mounted upon the frame, bars pivoted to the latter and having shoes for engagement with the axle of the automobile, pivotal connections between said bars and levers, curved segments fastened to the frame, and having apertures therein, each lever having a recess through which a segment passes, and plates for confining the segments within the recesses, hooks pivoted to the levers and engaging the apertures in the segments.

In testimony whereof I hereunto affix my signature in presence of two witnesses.

JOHN JAMES KOGER.

Witnesses:
E. B. KOGER,
A. TURLEY.

Copies of this patent may be obtained for five cents each, by addressing the "Commissioner of Patents, Washington, D. C."